US012734813B2

(12) United States Patent
(10) Patent No.: US 12,734,813 B2
(45) Date of Patent: Sep. 15, 2026

Nagaoka et al.

(54) LIQUID STORAGE CONTAINER

(71) Applicant: CANON KABUSHIKI KAISHA, Tokyo (JP)

(72) Inventors: Kyosuke Nagaoka, Tokyo (JP); Ryoji Inoue, Kanagawa (JP); Noriyasu Nagai, Tokyo (JP); Kenta Udagawa, Tokyo (JP); Hideaki Matsumura, Kanagawa (JP); Taiji Maruyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/970,578

(22) Filed: Dec. 5, 2024

(65) Prior Publication Data

US 2025/0091355 A1 Mar. 20, 2025

Related U.S. Application Data

(63) Continuation of application No. 18/364,919, filed on Aug. 3, 2023, now Pat. No. 12,187,041, which is a (Continued)

(30) Foreign Application Priority Data

Jul. 16, 2020 (JP) ................................ 2020-122278

(51) Int. Cl.

*B41J 2/175* (2006.01)
*B65D 47/12* (2006.01)
*B65D 49/08* (2006.01)

(52) U.S. Cl.

CPC ....... *B41J 2/17509* (2013.01); *B41J 2/17513* (2013.01); *B41J 2/17523* (2013.01); (Continued)

(58) Field of Classification Search

CPC .... B41J 2/175; B41J 2/17503; B41J 2/17506; B41J 2/17509; B41J 2/17513; (Continued)

(56) References Cited

U.S. PATENT DOCUMENTS

| | | | | |
|---|---|---|---|---|
| 6,123,212 | A | 9/2000 | Russell et al. | B65D 41/04 |
| 6,145,972 | A | 11/2000 | Udagawa et al. | 347/86 |

(Continued)

FOREIGN PATENT DOCUMENTS

| | | |
|---|---|---|
| CN | 1367751 | 9/2002 |
| CN | 1576021 | 2/2005 |

(Continued)

OTHER PUBLICATIONS

Extended European Search Report dated Dec. 14, 2021 in counterpart EP Application No. 21185101.9.

(Continued)

*Primary Examiner* — Anh T Vo

(74) *Attorney, Agent, or Firm* — Venable LLP

(57) ABSTRACT

An ink bottle replenishes an ink tank of an inkjet printing apparatus with ink and includes a storage portion containing ink, a discharge port portion having a discharge port through which stored ink is discharged, and a coupling portion having a male thread portion arranged on the outside and a cover portion including a female thread portion on the inside, configured to be attachable to and detachable from the discharge port, the female thread portion to be screwed to the male thread portion, the male thread portion being discontinuous in the coupling portion, the discontinuous male thread portion forming one helical shape as a whole. The discharge port portion, viewed from an ink discharge direction, has first to fourth arc portions extending along a circle having a diameter of a portion of the coupling portion, (Continued)

excluding a projecting portion of the male thread portion and including the male thread portion.

16 Claims, 9 Drawing Sheets

Related U.S. Application Data continuation of application No. 17/370,955, filed on Jul. 8, 2021, now Pat. No. 11,760,101.

(52) U.S. Cl.
CPC .......... *B41J 2/1754* (2013.01); *B65D 47/123* (2013.01); *B65D 49/08* (2013.01)

(58) Field of Classification Search
CPC .... B41J 2/1752; B41J 2/17523; B41J 2/1754; B41J 2/17596; B65D 47/123; B65D 49/08
See application file for complete search history.

(56) References Cited

U.S. PATENT DOCUMENTS

| | | | | |
|---|---|---|---|---|
| 6,244,695 | B1 | 6/2001 | Udagawa | 347/86 |
| 6,382,786 | B2 | 5/2002 | Iwanaga et al. | 347/86 |
| 6,416,173 | B2 | 7/2002 | Kishida et al. | 347/86 |
| 6,419,349 | B1 | 7/2002 | Iwanaga et al. | 347/86 |
| 6,527,381 | B1 | 3/2003 | Udagawa et al. | 347/86 |
| 6,652,949 | B2 | 11/2003 | Iwanaga et al. | 428/65.9 |
| 6,742,881 | B2 | 6/2004 | Kotaki et al. | 347/86 |
| 7,290,861 | B2 | 11/2007 | Inoue et al. | 347/49 |
| 7,311,388 | B2 | 12/2007 | Ogura et al. | 347/87 |
| 7,434,921 | B2 | 10/2008 | Udagawa | 347/85 |
| 7,735,984 | B2 | 6/2010 | Iijima et al. | 347/86 |
| 7,784,927 | B2 | 8/2010 | Inoue et al. | 347/86 |
| 7,854,499 | B2 | 12/2010 | Udagawa | 347/86 |
| 7,950,790 | B2 | 5/2011 | Kubo et al. | 347/86 |
| 8,002,397 | B2 | 8/2011 | Udagawa et al. | 347/86 |
| 8,087,762 | B2 | 1/2012 | Takemura et al. | 347/85 |
| 8,205,974 | B2 | 6/2012 | Ogura et al. | 347/86 |
| 8,313,185 | B2 | 11/2012 | Hatasa et al. | 347/92 |
| 8,322,807 | B2 | 12/2012 | Seki et al. | 347/6 |
| 8,469,498 | B2 | 6/2013 | Ohashi et al. | 347/86 |
| 8,550,607 | B2 | 10/2013 | Inoue et al. | 347/86 |
| 8,708,470 | B1 | 4/2014 | Blowfield et al. | B41J 2/175 |
| 9,333,758 | B2 | 5/2016 | Koshikawa et al. | B41J 2/1752 |
| 9,375,938 | B2 | 6/2016 | Kondo et al. | B41J 2/17513 |
| 9,597,884 | B2 | 3/2017 | Nanjo et al. | B41J 2/17526 |
| 9,738,081 | B2 | 8/2017 | Kimura et al. | B41J 2/175 |
| 9,821,562 | B2 | 11/2017 | Nanjo et al. | B41J 2/17523 |
| 9,840,082 | B2 | 12/2017 | Nanjo et al. | B41J 2/17513 |
| 9,908,338 | B2 | 3/2018 | Koshikawa et al. | B41J 2/17559 |
| 9,914,308 | B2 | 3/2018 | Yamada et al. | B41J 2/1404 |
| 9,975,340 | B2 | 5/2018 | Karita et al. | B41J 2/14024 |
| 9,981,464 | B2 | 5/2018 | Karita et al. | B41J 2/155 |
| 10,005,287 | B2 | 6/2018 | Yamada et al. | B41J 2/14072 |
| 10,029,474 | B2 | 7/2018 | Takada et al. | B01D 19/0073 |
| 10,118,396 | B2 | 11/2018 | Kimura et al. | B41J 29/377 |
| 10,195,868 | B2 | 2/2019 | Yamada et al. | B41J 2/175 |
| 10,207,511 | B2 | 2/2019 | Nanjo et al. | B41J 2/175 |
| 10,350,901 | B2 | 7/2019 | Mizutani et al. | B41J 2/17596 |
| 10,471,711 | B2 | 11/2019 | Karita et al. | B41J 2/16585 |
| 10,538,093 | B2 | 1/2020 | Nagashima et al. | B41J 2/17536 |
| 10,618,293 | B2 | 4/2020 | Koshikawa et al. | G03G 15/0886 |
| 10,654,625 | B2 | 5/2020 | Migas et al. | B65D 41/34 |
| 10,906,323 | B2 | 2/2021 | Nagaoka et al. | B41J 2/17553 |
| 10,994,548 | B2 | 5/2021 | Iinuma et al. | B41J 2/175 |
| 11,697,534 | B2 * | 7/2023 | Bassi | B65D 41/34 215/243 |
| 11,718,450 | B2 * | 8/2023 | Berroa | B65D 41/3428 215/243 |
| 2002/0113853 | A1 | 8/2002 | Hattori et al. | 347/86 |
| 2003/0043241 | A1 | 3/2003 | Hattori et al. | 347/86 |
| 2009/0237448 | A1 | 9/2009 | Kimura et al. | B41J 2/165 |
| 2009/0278900 | A1 | 11/2009 | Kondo et al. | 347/85 |
| 2013/0050310 | A1 | 2/2013 | Seki et al. | 347/6 |
| 2015/0266630 | A1 | 9/2015 | Scott et al. | B65D 41/04 |
| 2016/0200110 | A1 * | 7/2016 | Matsushita | B65D 51/20 347/85 |
| 2017/0120606 | A1 | 5/2017 | Koshikawa et al. | B41J 2/175 |
| 2017/0197426 | A1 | 7/2017 | Nagai et al. | B41J 2/1404 |
| 2017/0355191 | A1 | 12/2017 | Mizutani et al. | B41J 2/1754 |
| 2017/0355194 | A1 | 12/2017 | Fukasawa et al. | B41J 2/175 |
| 2017/0355197 | A1 | 12/2017 | Kudo et al. | B41J 2/17513 |
| 2018/0065375 | A1 | 3/2018 | Nagashima et al. | B41J 2/175 |
| 2018/0250943 | A1 | 9/2018 | Fukasawa et al. | B41J 2/175 |
| 2018/0272722 | A1 | 9/2018 | Murphy et al. | B41J 2/17506 |
| 2020/0198355 | A1 | 6/2020 | Tsuji et al. | B41J 2/17513 |
| 2020/0282729 | A1 | 9/2020 | Inoue et al. | B41J 2/175 |
| 2020/0316973 | A1 | 10/2020 | Toki et al. | B41J 2/17523 |
| 2021/0316554 | A1 | 10/2021 | Fukushima et al. | B41J 2/175 |
| 2021/0370680 | A1 | 12/2021 | Miyashita et al. | B41J 2/175 |
| 2022/0009244 | A1 | 1/2022 | Matsumura et al. | B41J 2/175 |
| 2022/0016892 | A1 | 1/2022 | Nagai et al. | B41J 2/175 |
| 2022/0016893 | A1 | 1/2022 | Nagai et al. | B41J 2/175 |
| 2022/0032633 | A1 | 2/2022 | Shimada et al. | B41J 2/175 |
| 2022/0032638 | A1 | 2/2022 | Mizutani et al. | B41J 2/175 |
| 2023/0062535 | A1 | 3/2023 | Okazaki et al. | B41J 2/175 |
| 2024/0190135 | A1 | 6/2024 | Mizutani et al. | B41J 2/17553 |

FOREIGN PATENT DOCUMENTS

| | | |
|---|---|---|
| CN | 104797427 | 7/2015 |
| CN | 105793050 | 7/2016 |
| CN | 106626787 | 5/2017 |
| CN | 107487084 | 12/2017 |
| CN | 107487087 | 12/2017 |
| CN | 107487088 | 12/2017 |
| CN | 207535503 U | 6/2018 |
| CN | 108528045 | 9/2018 |
| CN | 207955030 | 10/2018 |
| JP | 2009-046186 | 3/2009 |
| JP | 2010-052764 | 3/2010 |
| JP | 2013-244993 | 12/2013 |
| JP | 2018-034877 | 3/2018 |
| JP | 2018-095277 | 6/2018 |
| JP | 2018-144240 | 9/2018 |
| JP | 2018-149785 | 9/2018 |
| JP | 2019-038170 | 3/2019 |
| WO | 2020/077162 | 4/2020 |

OTHER PUBLICATIONS

Office Action dated Dec. 5, 2022 in counterpart Chinese Application No. 202110787356.4, together with English translation thereof.
Office Action dated Feb. 13, 2024 in counterpart Japanese Application No. 2020-122278, together with English translation thereof.
Office Action dated Jul. 9, 2024 in counterpart Japanese Application No. 2020-122278, together with English translation thereof.
Office Action dated Aug. 16, 2024 in counterpart Korean Application No. 2021-0090120, together with English translation thereof.
Office Action dated Jun. 28, 2025 in counterpart Chinese Application No. 202310873294.8, together with English translation thereof.
Korean Notice of Allowance issued Jan. 9, 2026, in related Korean Patent Appln. No. 10-2021-0090120.
Office Action dated Nov. 14, 2025 in counterpart Chinese Application No. 202310873294.8, together with English translation thereof.

* cited by examiner

LIQUID STORAGE CONTAINER

CROSS-REFERENCE TO RELATED APPLICATIONS

This application is a continuation of U.S. patent application Ser. No. 18/364,919 filed Aug. 3, 2023, currently pending, which is a continuation of U.S. patent application Ser. No. 17/370,955 filed Jul. 8, 2021, now issued as U.S. Pat. No. 11,760,101 on Sep. 19, 2023, and claims priority under 35 U.S.C. § 119 to Japan Patent Application JP2020-122278 filed in Japan on Jul. 16, 2020, and the contents of all of which are incorporated herein by reference as if set forth in full.

BACKGROUND OF THE DISCLOSURE

Field of the Disclosure

The present disclosure relates to a liquid storage container configured to store liquid.

Description of the Related Art

Among liquid tanks used in liquid ejecting apparatuses such as inkjet printing apparatuses, there is a liquid tank that can be replenished with liquid. For example, by using a liquid storage container including a discharge port for pouring the liquid, the liquid tank can be replenished with the liquid through the discharge port (see Japanese Patent Laid-Open No. 2018-144240 (hereafter, referred to as the '240 document)).

The '240 document describes a configuration in which a male thread is provided over the entire periphery of a liquid storage container main body and a cover member, provided with a female thread that can be screwed to the male thread, is attached and fixed to the liquid storage container main body to provide sealing and prevent the liquid from flowing out from the liquid storage container main body.

However, in a case when the male thread portion is provided over the entire periphery of the liquid storage container main body as in the configuration described in the '240 document, there is a possibility that, if an impact acts on the cover member due to dropping or the like, the liquid leaks from the liquid storage container main body due to breakage of the cover member or deformation of a liquid sealing portion.

SUMMARY OF THE DISCLOSURE

A liquid storage container according one aspect of the present disclosure includes a discharge port member including a discharge port through which liquid stored in a storage portion is discharged and a coupling portion in which a male thread portion is arranged on the outside, and a cover portion including a female thread portion on the inside and configured to be attachable to the discharge port member, the female thread portion configured to be screwed to the male thread portion, in which the male thread portion is discontinuous in the coupling portion.

Further features of the present disclosure will become apparent from the following description of exemplary embodiments with reference to the attached drawings.

DESCRIPTION OF THE EMBODIMENTS

Figure 1:
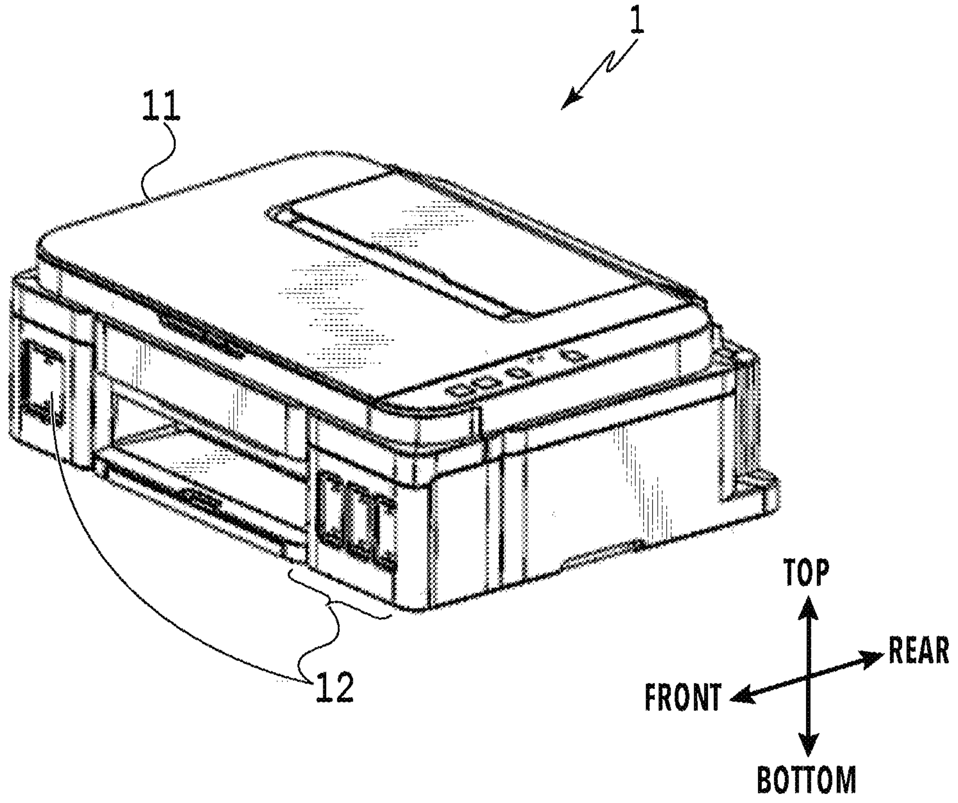
FIG. 1 is a perspective view of an outer appearance of a liquid ejecting apparatus.

Embodiments are described below with reference to the drawings. Note that the same configurations in the description are denoted by the same reference numerals. Moreover, the arrangement of constituent elements relative to one another, the shapes of the constituent elements, and the like, that are described in the embodiments are merely examples.

First Embodiment

FIG. 1 is a perspective view of an outer appearance of a liquid ejecting apparatus 1 in the embodiment. The liquid ejecting apparatus 1 illustrated in FIG. 1 is a serial inkjet printing apparatus. The liquid ejecting apparatus 1 illustrated in FIG. 1 includes a case 11 and liquid tanks 12 arranged inside the case 11. Each liquid tank 12 stores an ink that is liquid to be ejected to a print medium (not illustrated).

Figure 2:
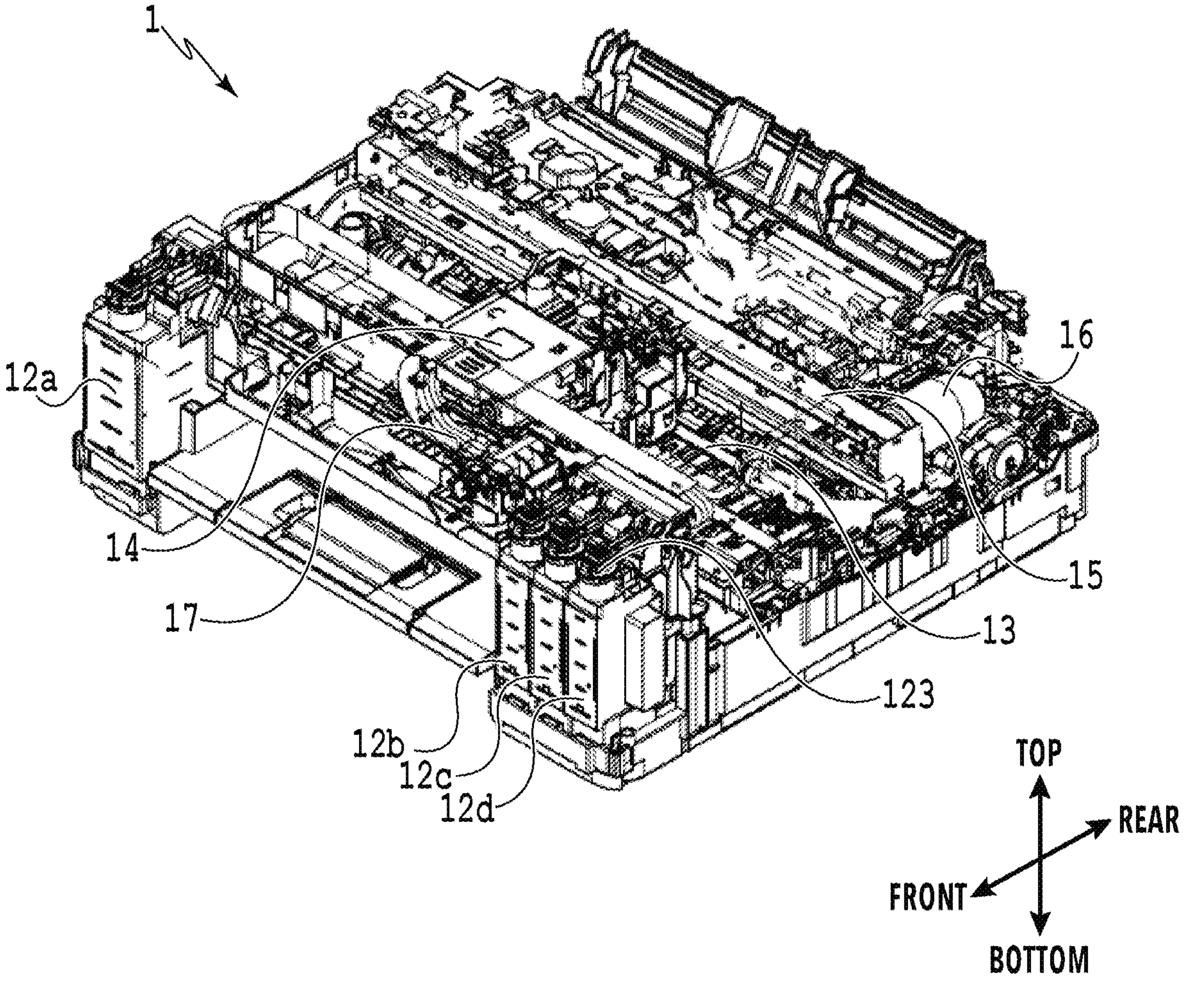
FIG. 2 is a perspective view of an internal configuration of the liquid ejecting apparatus.

FIG. 2 is a perspective view of an internal configuration of the liquid ejecting apparatus 1 illustrated in FIG. 1. In FIG. 2, the liquid ejecting apparatus 1 includes a conveyance roller 13 used to convey the print medium (not illustrated), a carriage 15 provided with a print head 14 configured to eject the liquid, and a carriage motor 16 used to drive the carriage 15. The print medium is not limited to a particular medium as long as an image can be formed on the medium with the liquid ejected from the print head 14. For example, paper, cloth, the label surfaces of optical discs, plastic sheets, overhead projector (OHP) sheets, or the like, can be given as print media.

The liquid is stored in the liquid tanks 12 and is supplied to the print head 14 via a liquid distribution passage 17 to be ejected from the print head 14. In the embodiment, inks of four colors (for example, cyan, magenta, yellow, and black) are used as the liquid, and four liquid tanks 12*a* to 12*d* for the respective colors that store the inks of the respective colors are provided as the liquid tanks 12. In the following description, in the case when the individual liquid tanks, distinguished from one another, are referred, alphabets are added at the ends, for example, liquid tanks 12*a* to 12*d*. In the case when any one of the liquid tanks is referred to, the liquid tank is referred to as the liquid tank 12. The liquid tanks 12*a* to 12*d* for the respective colors are arranged in a front face portion of the liquid ejecting apparatus 1 inside the case 11.

Figure 3A:
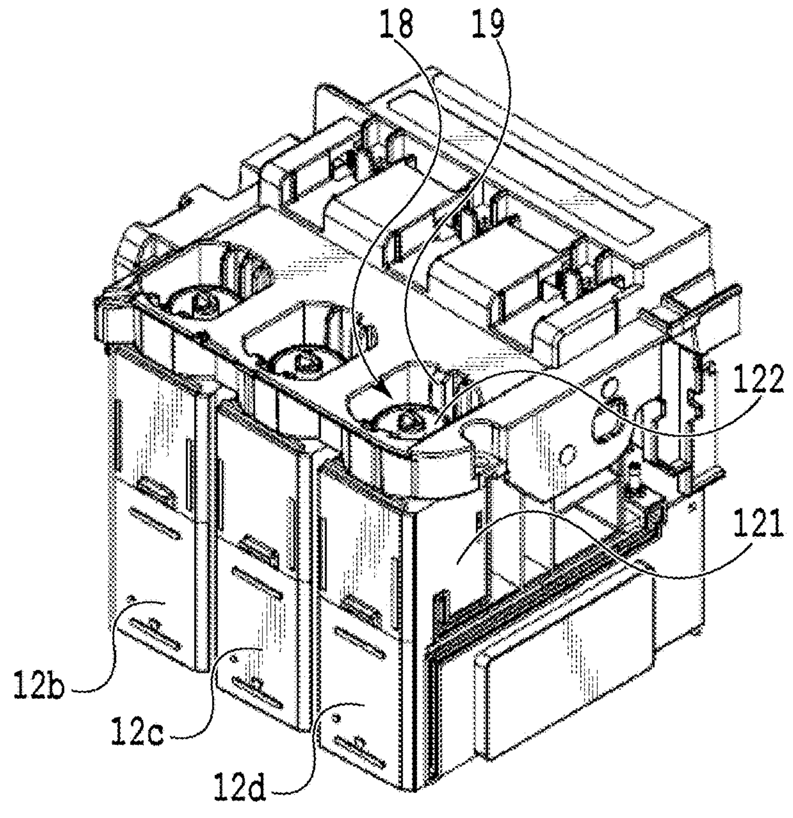
FIGS. 3A and 3B are an enlarged perspective view and plan view of a portion of the liquid ejecting apparatus in which liquid tanks are housed.
Figure 3B:
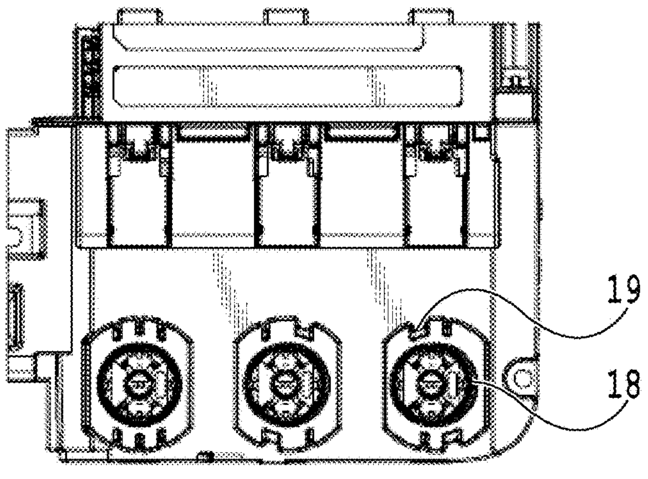

FIG. 3A is an example of an enlarged perspective view of a portion of the liquid ejecting apparatus 1 illustrated in FIG. 1 in which the liquid tanks 12*b* to 12*d* are housed, and FIG. 3B is a plan view corresponding to the perspective view illustrated in FIG. 3A. Each liquid tank 12 includes a liquid tank main body 121 used to store the liquid and a communication flow passage 122 communicating with a liquid storage chamber in the liquid tank main body 121. The liquid tank 12 includes a tank cover 123 (see FIG. 2) configured to be attachable to cover the communication flow passage 122 and to seal the storage chamber in the liquid tank main body 121 on occasions other than an occasion of liquid replenishment. In the case when the liquid tank 12 is replenished with the liquid, a discharge port of a liquid storage container 2 (see FIG. 4) is inserted into the communication flow passage 122 and the liquid is poured into the liquid tank 12. The liquid storage chamber is sealed with the tank cover 123 in occasions other than the occasion of liquid replenishment, and thus it is possible to reduce evaporation of the liquid in the liquid tank 12. The communication flow passage 122 includes two flow passages extending parallel to each other in the vertical direction in an interior thereof and is configured to allow the liquid in the liquid storage container 2 to be poured into the liquid tank by means of gas-liquid exchange. In some cases, a socket 18 is provided in a portion of the liquid ejecting apparatus 1 where the discharge port of the liquid storage container 2 is to be inserted. In the case when the socket 18 is provided, the socket 18 is provided with protruding portions 19 protruding inward from an inner peripheral wall of the socket 18. The socket 18 is provided for each liquid tank 12, and the shapes of the protruding portions 19 vary among the sockets 18 to suppress erroneous insertion of the liquid container. The protruding portions 19 are rotationally symmetric by 180° with respect to the center axis of the communication flow passage 122.

Figure 4:
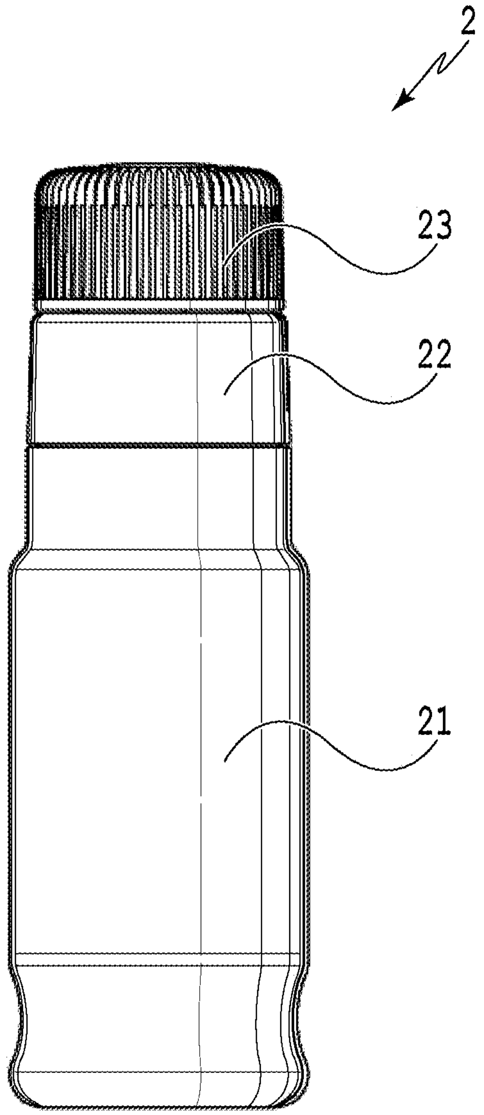
FIG. 4 is an outer appearance view of a liquid storage container.

FIG. 4 is an elevation view of an outer appearance of the liquid storage container 2 which is a liquid container used to replenish the liquid tank 12 with the liquid. The liquid storage container 2 in FIG. 4 includes a bottle 21 that is a storage portion (main body portion) configured to store the liquid, a nozzle 22 coupled to the bottle 21, and a cap 23 attachable to and detachable from the nozzle 22. The nozzle 22 is a discharge port member having a function of an outlet for the case where the liquid stored in the bottle 21 is discharged. The cap 23 is a cover portion that is attached to the nozzle 22 to shield the interior of the liquid storage container 2 (specifically, the bottle 21) from the outside air. Methods of coupling the bottle 21 and the nozzle 22 to each other include a method of sealing a space between the bottle 21 and the nozzle 22 by inserting a flexible part, a method of forming both of the bottle 21 and the nozzle 22 with resin parts and welding the two parts together, and the like. The bottle 21 and the nozzle 22 may be an integral part.

Figure 5A:
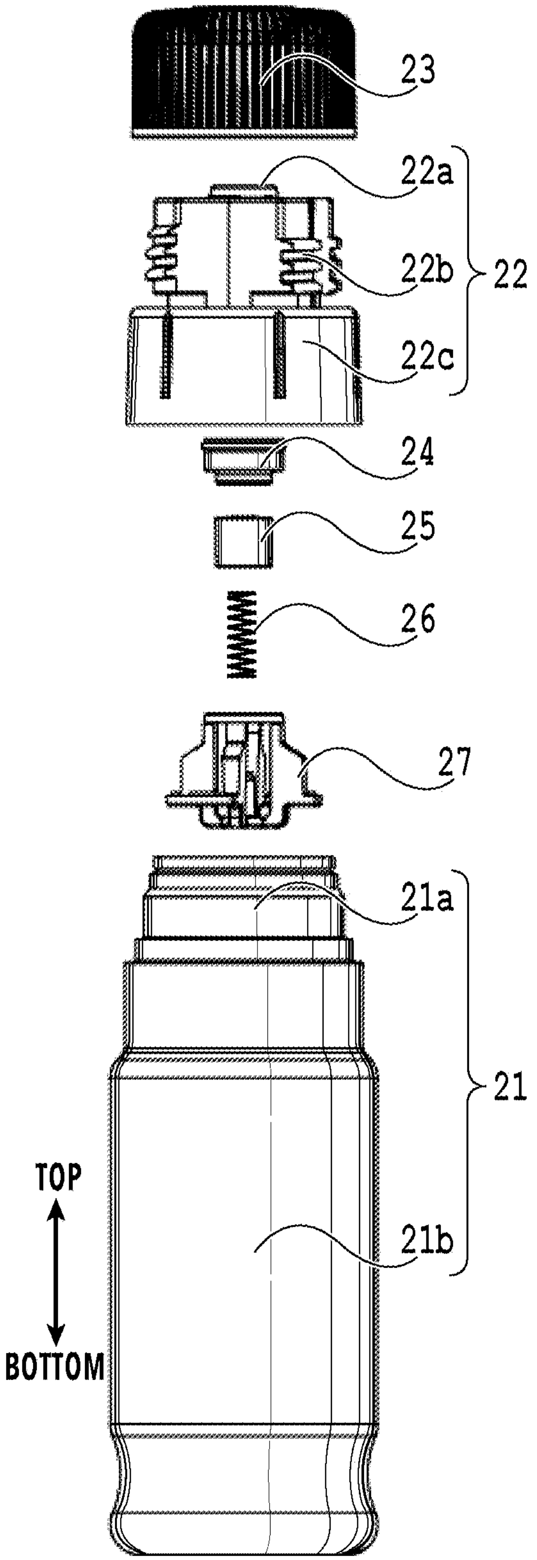
FIGS. 5A and 5B are a part configuration view and cross-sectional view of the liquid storage container.
Figure 5B:
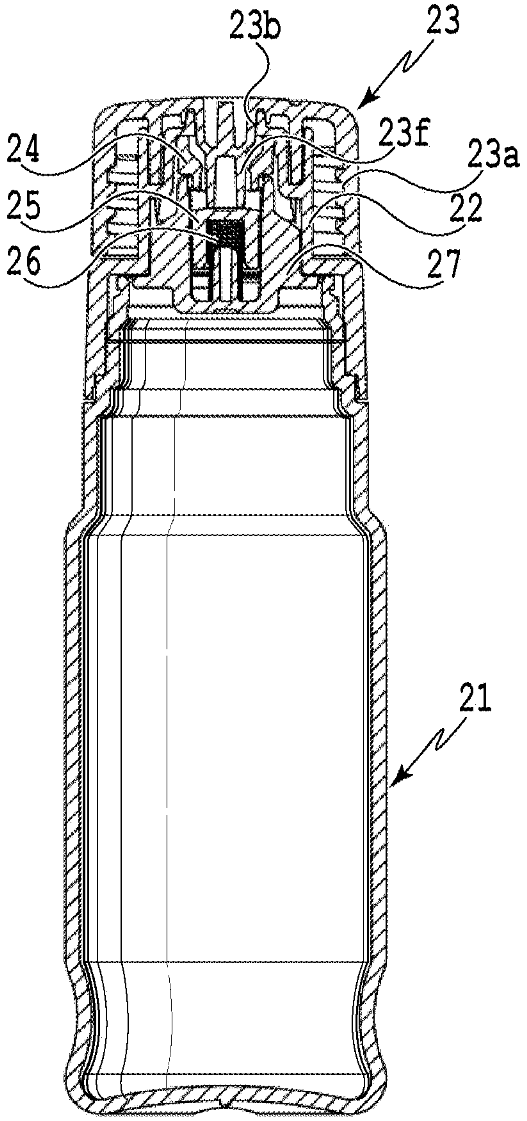

FIG. 5A illustrates an example of a part configuration view of the liquid storage container 2 illustrated in FIG. 4. FIG. 5B is a cross-sectional view in which the parts in the part configuration view of the liquid storage container 2 illustrated in FIG. 5A are coupled to one another. The bottle 21 of the liquid storage container 2 includes a bottle welding portion 21*a* formed in an upper portion and a liquid storage portion 21*b* formed in a lower portion. The nozzle 22 includes a discharge port 22*a* through which the liquid is discharged, a coupling portion 22*b* in which a male thread structure is formed on the outside, and a nozzle welding portion 22*c* in which a welding surface is formed on the inside or a bottom surface. The cap 23, which is the cover portion, is configured to be attachable to and detachable from the nozzle 22, which is the discharge port member, and can open and close the discharge port 22*a*. Polyethylene (PE), polypropylene (PP), and the like can be given as examples of the material forming the bottle 21. Polyethylene (PE), polypropylene (PP), and the like, can be given as the material forming the nozzle 22. The nozzle 22 is joined to the bottle 21 by welding the nozzle welding portion 22*c* to the bottle welding portion 21*a*. In the case when the bottle 21 and the nozzle 22 are joined by being welded to each other, the bottle 21 and the nozzle 22 are preferably made of the same type of material. A seal 24 having an opening, a valve 25 configured to open and to close the opening of the seal 24, a spring 26 configured to bias the valve 25, and a holder 27 configured to fix the spring 26 are included inside the nozzle 22.

As an example of a method of attaching the cap 23 to the nozzle 22, there is a method of screwing the cap 23 to the nozzle 22. Specifically, as illustrated in FIGS. 5A and 5B, there is a method of screwing the cap 23 to the nozzle 22 by using the coupling portion 22*b* in which the male thread structure is formed on the outside of the nozzle 22 and a cap thread portion 23*a* in which a female thread structure is formed on the inside of a lower portion of the cap 23. As described above, the cap 23 is attached to the nozzle 22 by screwing the cap thread portion 23*a* to the coupling portion 22*b*. In this case, a cap sealing portion 23*b* of the cap 23 and part of the discharge port 22*a* of the nozzle 22 are fitted to each other, and the inside of the liquid storage container 2 is sealed. Specifically, a contact portion between the cap sealing portion 23*b* and the part of the discharge port 22*a* of the nozzle 22 form a sealing portion.

Figure 6A:
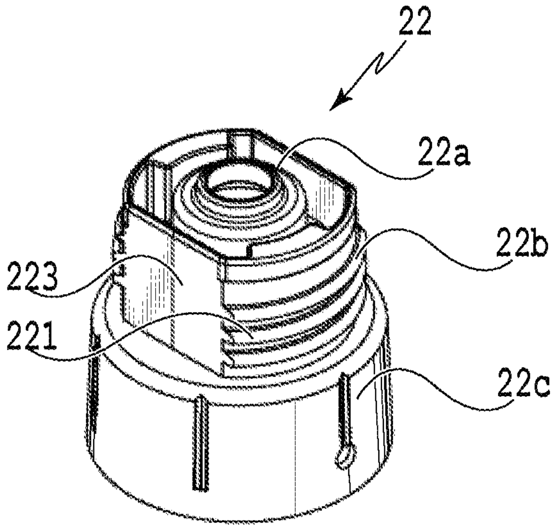
FIGS. 6A and 6B are explanatory views of a nozzle.
Figure 6B:
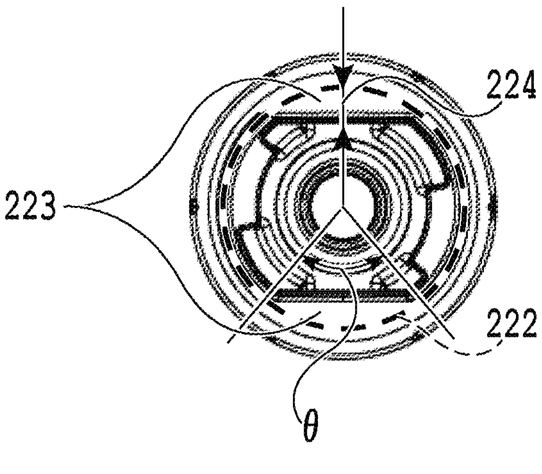

FIGS. 6A and 6B are explanatory views of the nozzle 22, which is the discharge port member of the embodiment. FIG. 6A is an example of a perspective view of a part shape of the nozzle 22. FIG. 6B is a top view corresponding to FIG. 6A. Male thread portions 221 of the nozzle 22 in the embodiment have a discontinuous structure. Specifically, the male thread portions 221 are not continuously formed over the entire periphery of the nozzle 22 and are partially discontinuous. The discontinuous male thread portions 221 form one helical shape as a whole and are configured such that discontinuous male threads are screwed to a female thread in the cap. Note that a discontinuous portion may be partially formed in the cap thread portion 23*a* of the cap 23.

Recess portions 223 are formed at least partially in the portions where the male thread portions 221 are discontinuous. As illustrated in FIG. 6B, the recess portions 223 in the embodiment are portions that are ends of spaces formed on the inner radial side of a circle 222 (illustrated by a dotted line) formed along a base of the coupling portion 22*b* including the male thread portions 221 in the top view of the nozzle 22. The diameter of the circle 222 is a diameter corresponding to the rotation radius in opening of the cap and is about 15 mm or more and 40 mm or less. The diameter of the circle 222 corresponds to the diameter of a portion of the coupling portion 22*b* excluding the projecting portions of the male thread portions 221. The width 224 of each recess portion 223 in the nozzle 22 is preferably 0.5 mm or more, more preferably 1.0 mm or more from a viewpoint of an effect on drop resistance. In this case, the width 224 of the recess portion 223 corresponds to a distance between the recess portion 223 and an arc of the circle 222 corresponding to the recess portion 223. In this example, the width 224 corresponds to the maximum distance between the nozzle 22 and the circle 222 in the top view of the nozzle 22. A proportion of the recess portions 223 to the circle 222 is preferably 10% or more, more preferably 20% or more from the viewpoint of effect on drop resistance. Meanwhile, the proportion of the recess portions 223 to the circle 222 is preferably 90% or less, more preferably 70% or less from a viewpoint of preventing loosening of the cap due to vibration, or the like. In this case, the proportion of the recess portions 223 to the circle 222 refers to the proportion of the angles of the recess portions 223 to 360° which is the angle of the entire periphery of the circle 222. In the example illustrated in FIGS. 6A and 6B, the recess portions 223 are provided at two locations to be rotationally symmetric. Accordingly, the proportion of the recess portions 223 to the circle 222 can be obtained from θ×2/360, where θ is the angle θ illustrated in FIG. 6B.

Configuring the male thread portions 221 of the nozzle 22 to be discontinuous as described above can suppress leakage of the liquid from the main body of the liquid storage container 2 in the case when an impact acts on to the cap 23, which is the cover portion, due to dropping, or the like. Note that, although the example in which the recess portions 223 are provided at two locations to be rotationally symmetric by 180° is described in the example of FIGS. 6A and 6B, the recess portions 223 do not have to be provided at multiple locations. The recess portion 223 only needs to be provided at least one location. Moreover, the recess portions 223 and the portions used for alignment in the replenishment of the liquid tank 12 of the liquid ejecting apparatus 1 with the liquid may be the same portions. The recess portions used for the alignment are described below by using FIGS. 7A and 7B.

Figure 7A:
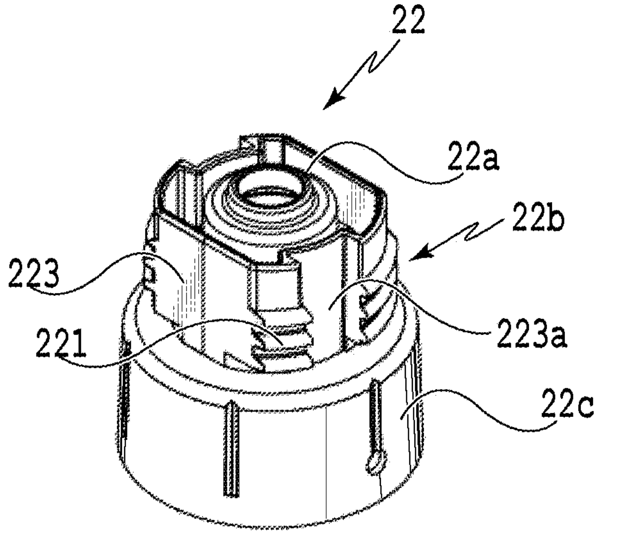
FIGS. 7A and 7B are views of another example of the nozzle.
Figure 7B:
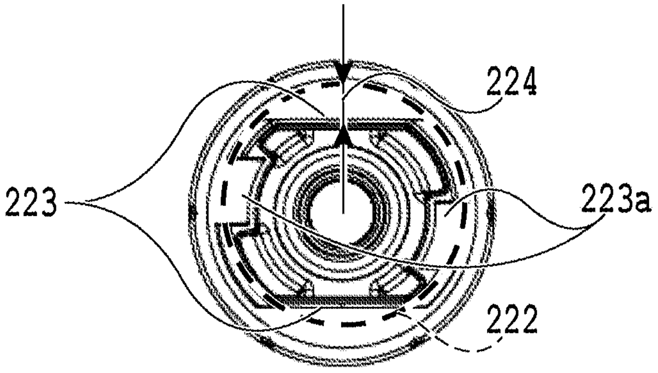

FIGS. 7A and 7B are views of another example of the nozzle 22 in the embodiment. FIG. 7A is a perspective view of a part shape of the nozzle 22, and FIG. 7B is a top view corresponding to FIG. 7A. The nozzle 22 of FIGS. 7A and 7B includes recess portions 223*a* that are rotationally symmetric by 180° and is configured such that the recess portions 223*a* engage with the protruding portions 19 protruding inward from the inner peripheral surface of the socket 18 provided in the liquid tank 12 of the liquid ejecting apparatus 1. Using the liquid storage container 2 including the recess portions 223*a* configured to engage with the protruding portions 19 varying in shape depending on the color of the liquid tank 12 can prevent erroneous pouring in which the liquid of a liquid storage container 2 of a wrong color is poured into the liquid tank 12. Moreover, in this configuration, the portions used for alignment with the liquid ejecting apparatus 1 are provided in the coupling portion 22*b* configured to function as the nozzle thread portion. Accordingly, this configuration can contribute to size reduction of the liquid storage container 2. Note that, although FIGS. 7A and 7B illustrate the example in which the recess portions 223*a* configured to engage with the protruding portions 19 of the liquid tank 12 are separately provided in addition to the recess portions 223 illustrated in FIGS. 6A and 6B, providing the recess portions 223 is not essential. Specifically, the coupling portion 22*b* may be provided only with the recess portions 223*a* configured to engage with the protruding portions 19 of the liquid tank 12.

The above is the description of the male thread portions 221 of the nozzle 22. Next, the internal structure of the nozzle 22 is described with reference to FIGS. 5A and 5B again. The seal 24 which is an orifice portion having an opening into which the communication flow passage 122 is inserted is arranged in a front end (upper end) of the nozzle 22. Then, the valve 25, which is a valve element of a liquid stop valve, is biased toward the opening with the spring 26, thereby the gap between the seal 24 and the valve 25 is closed, and the liquid storage container 2 is sealed. In the embodiment, the spring 26 is used as a biasing mechanism, and the holder 27 fixed in an inner space of the nozzle 22 holds the spring 26. The seal 24 is formed of a flexible member made of rubber, an elastomer, or the like. Polyethylene (PE), polypropylene (PP), and the like, can be given as the material forming the valve 25. Stainless steel (SUS), and the like, can be given as the material forming the spring 26. Polyethylene (PE), polypropylene (PP), and the like, can be given as the material forming the holder 27. Welding, and the like, can be given as a method of fixing the holder 27 to the nozzle 22.

In the case when the liquid is supplied from the liquid storage container 2 to the liquid tank 12, the communication flow passage 122 is inserted into the nozzle 22 through the opening of the seal 24, thereby opening the valve 25. Then, in the case when the nozzle 22 of the liquid storage container 2 is provided with the recess portions 223*a* configured to engage with the protruding portions 19 in the socket 18 of the liquid ejecting apparatus 1 as described above, alignment of the liquid storage container 2 can be achieved with the socket 18. Then, the liquid in the liquid storage container 2 is supplied to the storage chamber of the liquid tank main body 121 via the communication flow passage 122 by means of hydraulic head difference. Note that, as illustrated in FIG. 5B, a protrusion 23*f*, or the like, may be provided in the cap 23 to cause the valve 25 to open in cap-opening and cap-closing. In the case when the pressure in the liquid storage container 2 is higher than the outside air pressure, this configuration can suppress rushing of the liquid into the liquid tank 12 and overflowing of the liquid from the liquid tank 12 in supplying of the liquid to the liquid tank 12.

As described above, in the embodiment, the male thread portions 221 of the nozzle 22 are discontinuous. Since the male thread portions 221 of the nozzle 22 are not provided over the entire periphery, it is possible to suppress propagation of impact between the nozzle 22 and the cap 23, which is the cover portion, in the case when an impact acts on the cap 23 due to dropping, or the like. Accordingly, it is possible to suppress leakage of the liquid from the sealing portion between the cap 23 and the nozzle 22 and suppress breakage of the cap 23. Moreover, since the stiffness of the nozzle 22 is reduced by the formation of the recess portions 223 (or the recess portions 223*a*) in the nozzle 22, the impact to the cap 23 can be further suppressed.

EXAMPLES

Various examples are described below. Note that the following examples are merely for exemplifying purposes, and the present disclosure is not limited to these examples.

Example 1

Figure 8:
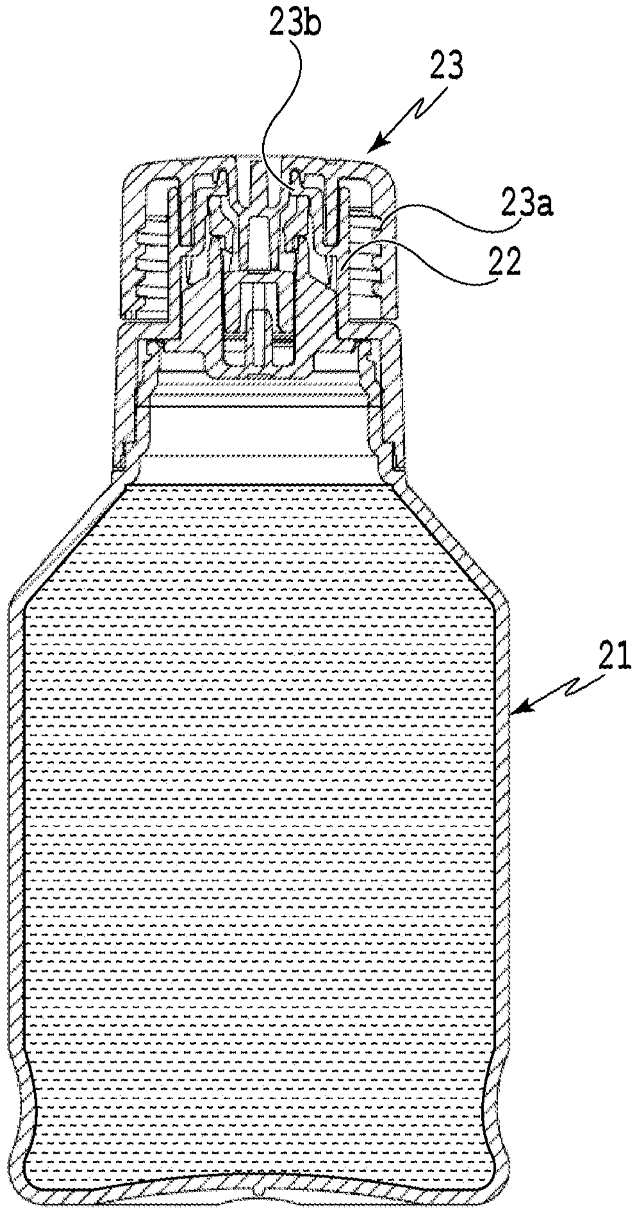
FIG. 8 is a cross-sectional view of a liquid storage container.

FIG. 8 is a cross-sectional view of the liquid storage container 2 used in the examples. In the liquid storage container 2 illustrated in FIG. 8, a polypropylene bottle with an outer diameter of Φ64 mm and a height of 100 mm was used as the bottle 21. A polypropylene cap having an outer diameter of Φ33 mm and including a female thread portion with an inner diameter of Φ27.2 mm was used as the cap 23.

Figures 9A, 9B, 9C, 9D, 9E, 9F, 9G, 9H, 9I:
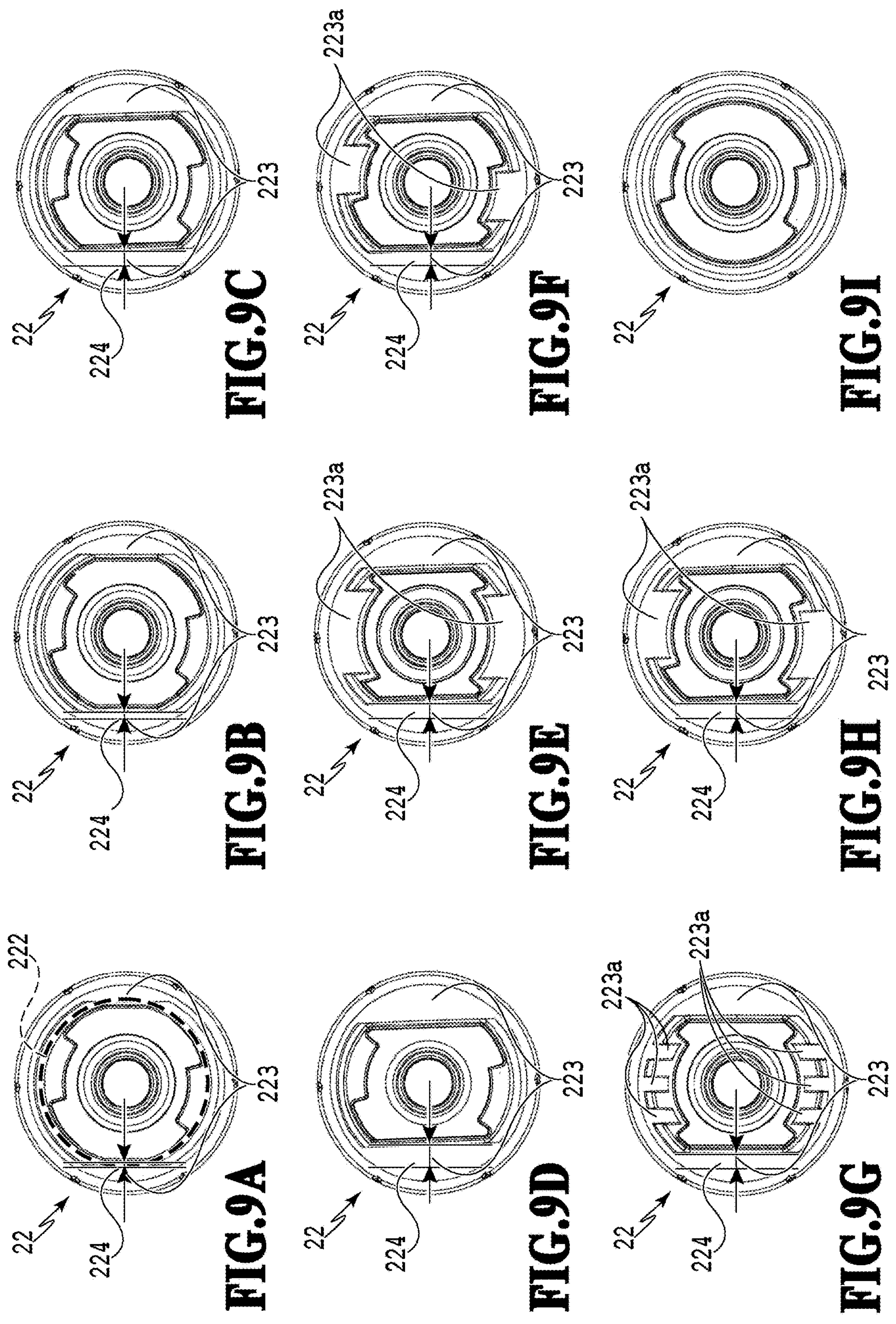
FIGS. 9A to 9I are top views of the nozzles used in the respective examples.

FIGS. 9A to 9I illustrate top views of the nozzles 22 used in the respective examples. FIG. 9A illustrates a top view of the nozzle 22 used in Example 1. As the nozzle 22, there was used a polypropylene nozzle in which the diameter of the circle 222 formed along the base of the male thread portions was Φ27.0 mm, the width 224 of the recess portions was 0.5 mm, and the proportion of the recess portions to the circle 222 was 17%. The liquid storage container 2 was fabricated with the other configurations being the same as those in FIG. 5.

Example 2

In the nozzle 22 of Example 2 illustrated in FIG. 9B, the width 224 of the recess portions was 1.0 mm, and the proportion of the recess portions to the circle 222 was 25%. The liquid storage container 2 was fabricated with the other configurations being the same as those in Example 1.

Example 3

In the nozzle 22 of Example 3 illustrated in FIG. 9C, the width 224 of the recess portions was 2.5 mm, and the proportion of the recess portions to the circle 222 was 39%. The liquid storage container 2 was fabricated with the other configurations being the same as those in Example 1.

Example 4

In the nozzle 22 of Example 4 illustrated in FIG. 9D, the width 224 of the recess portions was 3.5 mm, and the proportion of the recess portions to the circle 222 was 48%. The liquid storage container 2 was fabricated with the other configurations being the same as those in Example 1.

Example 5

In the nozzle 22 of Example 5 illustrated in FIG. 9E, the width 224 of the recess portions was 2.5 mm. Moreover, the nozzle 22 was provided with the recess portions 223*a* configured to engage with the protruding portions 19 in the socket 18 of the liquid ejecting apparatus 1 and provided at two locations to be rotationally symmetric by 180°. The proportion of the recess portions to the circle 222 was 73%. The liquid storage container 2 was fabricated with the other configurations being the same as those in Example 1.

Example 6

In the nozzle 22 of Example 6 illustrated in FIG. 9F, the width 224 of the recess portions was 2.5 mm. Moreover, the nozzle 22 was provided with the recess portions 223*a* configured to engage with the protruding portions 19 in the socket 18 of the liquid ejecting apparatus 1 and provided at two locations to be rotationally symmetric by 180°. The proportion of the recess portions to the circle 222 was 59%. The liquid storage container 2 was fabricated with the other configurations being the same as those in Example 1.

Example 7

In the nozzle 22 of Example 7 illustrated in FIG. 9G, the width 224 of the recess portions was 2.5 mm. Moreover, the nozzle 22 was provided with the recess portions 223*a* configured to engage with the protruding portions 19 in the socket 18 of the liquid ejecting apparatus 1 and provided at six locations to be rotationally symmetric by 180°. The proportion of the recess portions to the circle 222 was 59%. The liquid storage container 2 was fabricated with the other configurations being the same as those in Example 1.

Example 8

In the nozzle 22 of Example 8 illustrated in FIG. 9H, the width 224 of the recess portions was 2.5 mm. Moreover, the nozzle 22 was provided with the recess portions 223*a* configured to engage with the protruding portions 19 in the socket 18 of the liquid ejecting apparatus 1 and provided at two locations to be rotationally symmetric by 180°. The proportion of the recess portions to the circle 222 was 66%. The liquid storage container 2 was fabricated with the other configurations being the same as those in Example 1.

Comparative Example 1

The nozzle 22 of Comparative Example 1 illustrated in FIG. 9I was a configuration without the recess portions. Accordingly, the proportion of the recess portions to the circle 222 was 0%. The liquid storage container 2 was fabricated with the other configurations being the same as those in Example 1.

<Evaluation of Drop Resistance>

Ink of 200 ml was poured into the liquid storage container 2 fabricated in each of Examples 1 to 8 and Comparative Example 1, and drop resistance from height of 180 cm was evaluated. The evaluation was made based on the criteria described below. Evaluation results are described in Table 1 as "drop resistance".

TABLE 1

| | | E1 | E2 | E3 | E4 | E5 | E6 | E7 | E8 | Comparative Example 1 |
|---|---|---|---|---|---|---|---|---|---|---|
| Recess portions | Width of recess portions (mm) | 0.5 | 1.0 | 2.5 | 3.5 | 2.5 | 2.5 | 2.5 | 2.5 | None |
| | Proportion of recess portions to arc (%) | 17 | 25 | 39 | 48 | 73 | 59 | 59 | 66 | 0 |
| | Shape | a | b | c | d | E | f | g | h | i |
| Drop resistance | | B | A | A | A | B | A | A | A | C |

The "E1" to "E8" in Table 1 correspond to above Example 1 to Example 8, respectively. The shapes "a" to "i" in Table 1 correspond to the nozzles in FIGS. 9A to 9I, respectively. Moreover, the signs in the drop resistance in Table 1 indicate the following results.

A: No leakage of the ink from the sealing portion of the cap was found.

B: A small leakage of the ink from the sealing portion of the cap was found.

C: The ink leaked to the outside of the bottle, or breakage of the cap was found.

In Examples 1 to 8, neither the leakage of the ink to the outside of the bottle nor the breakage of the cap was found. Comparison among Examples 1 to 4 indicates that the drop resistance further improves in the case where the width of the recess portions in the nozzle is 1 mm or more. Moreover, comparison among Examples 5 to 8 indicates that the drop resistance further improves in the case where the proportion of the recess portions to the circle formed along the base of the male thread is 70% or less. Meanwhile, Comparative Example 1 had the configuration in which the male thread portion was not discontinuous and no recess portions were provided, and the drop resistance did not improve in Comparative Example 1.

Other Embodiments

Although the example in which the liquid storage container is used to replenish the liquid tank of the liquid ejecting apparatus with the liquid is described in the above embodiment, the liquid storage container may be a container used to replenish a liquid tank of any apparatus with liquid. Moreover, although the example in which the ink is used as the liquid stored in the liquid storage container is described, the liquid storage container may store any kind of liquid.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An ink bottle for replenishing an ink tank of an inkjet printing apparatus with ink, the ink bottle comprising:

a storage portion that contains ink;

a discharge port portion connected to the storage portion and including a discharge port through which ink stored in the storage portion can be discharged and a coupling portion in which a male thread portion is arranged on the outside; and a cover portion including a female thread portion on the inside and configured to be attachable to and detachable from the discharge port portion, the female thread portion configured to be screwed to the male thread portion, wherein the male thread portion is discontinuous in the coupling portion and the discontinuous male thread portion forms one helical shape as a whole, the discharge port portion, viewed from an ink discharge direction, has:

a plurality of arc portions including first to fourth arc portions that are along a circle having a diameter of a portion of the coupling portion excluding a projecting portion of the male thread portion and including the male thread portion, a plane portion including a first plane portion and a second plane portion formed on an inner radial side of the circle and provided rotationally symmetrically by one hundred eighty degrees with respect to a center of the circle, and a plurality of recess portions including a first recess portion and a second recess portion formed on the inner radial side of the circle, wherein the first arc portion, the first plane portion, and the second arc portion are continuously provided in this order, the third arc portion, the second plane portion, and the fourth arc portion are continuously provided in this order, the first recess portion is provided between the first arc portion and the third arc portion, and the second recess portion is provided between the second arc portion and the fourth arc portion.

2. The ink bottle according to claim 1, wherein the plane portion and the recess portion do not comprise the male thread portion.

3. The ink bottle according to claim 1, wherein a distance between the plane portion and an arc of the circle corresponding to the plane portion is 0.5 mm or more.

4. The ink bottle according to claim 1, wherein in the coupling portion, a proportion of the first and second plane portions and the plurality of recess portions to the circle is between ten percent and ninety percent inclusive.

5. The ink bottle according to claim 1, wherein in the coupling portion, a proportion of the first and second plane portions and the plurality of recess portions to the circle is between twenty percent and seventy percent inclusive.

6. The ink bottle according to claim 1, wherein the first recess portion, the first arc portion, the first plane portion, the second arc portion, and the second recess portion are continuously provided in this order in the discharge port portion.

7. The ink bottle according to claim 1, further comprising a sealing portion formed by a contact portion between the cover portion and the discharge port portion.

8. The ink bottle according to claim 1, wherein the discharge port portion comprises therein a liquid stop valve, the cover portion comprises therein a protrusion that opens the liquid stop valve as the cover portion closes, and the protrusion opens the liquid stop valve while the cover portion is attached to the discharge port portion.

9. The ink bottle according to claim 8, wherein the liquid stop valve comprises an orifice portion, a valve element, and a biasing mechanism that biases the valve element, and a gap between the orifice portion and the valve element is closed by the biasing mechanism.

10. The ink bottle according to claim 1, wherein the recess portion of the coupling portion is configured to engage with a protruding portion formed in a socket provided to surround the outside of the ink tank.

11. The ink bottle according to claim 10, wherein the recess portion engages with the protruding portion in a case when the ink tank is replenished with ink.

12. The ink bottle according to claim 10, wherein the inkjet printing apparatus comprises the plurality of ink tanks, the sockets of the ink tanks having different shapes, respectively, and the recess portion of the coupling portion can engage with only the protruding portion formed in the socket of one ink tank of the plurality of ink tanks but does not engage with the protruding portions formed in the sockets of the other ink tanks.

13. The ink bottle according to claim 10, wherein at least one of the plurality of recess portions engages with the protruding portion and the other recess portions do not engage with the protruding portion.

14. The ink bottle according to claim 10, wherein the socket of the ink tank comprises the plurality of protruding portions, the coupling portion comprises the plurality of recess portions, and the plurality of recess portions engage with the plurality of protruding portions, respectively.

15. The ink bottle according to claim 1, wherein the ink bottle is configured to replenish the inkjet printing apparatus with ink, the inkjet printing apparatus comprising a tank cover that seals the ink tank, which is configured to be replenished with ink by opening the tank cover.

16. The ink bottle according to claim 1, wherein in the discharge port portion viewed from the ink discharge direction, the first recess portion and the second recess portion are portions that are ends of spaces provided rotationally symmetrically by one hundred eighty degrees with respect to the center of the circle.

* * * * *